REVERTING CALL CIRCUIT
Filed Jan. 15, 1948
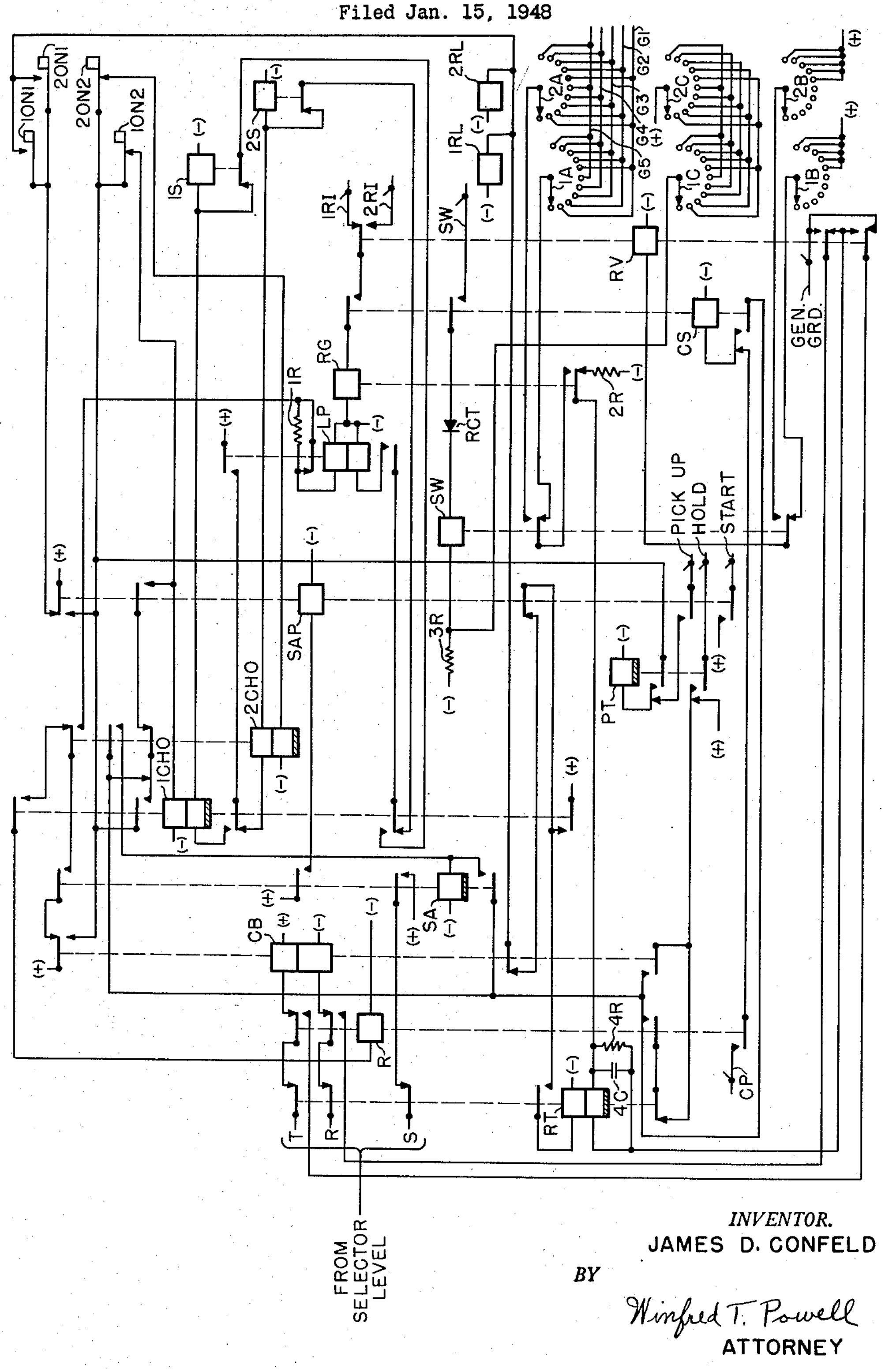
INVENTOR.
JAMES D. CONFELD
BY *Winfred T. Powell*
ATTORNEY Patented Nov. 13, 1951 2,574,532

UNITED STATES PATENT OFFICE 2,574,532

REVERTING CALL CIRCUIT

James D. Confeld, Rochester, N. Y., assignor to Stromberg-Carlson Company, a corporation of New York Application January 15, 1948, Serial No. 2,403

9 Claims. (Cl. 179—17)

This invention relates to automatic telephone systems and it more particularly pertains to improved circuit arrangements for setting up reverting call connections between two sub-stations associated with the same multi-party line.

In automatic telephone exchanges, wherein reverting call switches are utilized for selective ringing purposes in the setting up of reverting call connections, it is the usual practice to assign two different directory numbers to each sub-station connected to a multi-party line. The directory numbers assigned to a particular sub-station are usually the same except for the last digit thereof, which digit is used in the selection of the ringing signal designating the particular sub-station. More specifically, those digits of the regular directory numbers, that is, those numbers which are dialed in setting up line to line connections through an automatic switch train and are utilized in setting the switches of the train, are not the same as the reverting call digits. Moreover, since the reverting call switches or links are usually seized through a particular level of the first selectors included in the system, the first digit of the reverting call directory number assigned to a particular substation served by a multi-party line differs from the first digit of the regular directory number assigned to the same sub-station. It will thus be seen that there are wide differences in the directory number designations for each multi-party sub-station.

It is the object of the present invention to provide improved circuits for setting up reverting call connections between the sub-stations associated with multi-party lines of an automatic telephone system, which circuits are so arranged that unnecessary duplication of the ringing signals applied to the line on a reverting call connection is eliminated.

According to another object of the invention, the improved reverting call signaling circuits are arranged to transmit both the called and the calling station signals only when the signals for these two stations are such that both would not ordinarily be heard by both stations.

According to still another object of the invention, an improved circuit arrangement is provided for ringing only the called station on a reverting call connection when, in a combination code and harmonic ringing system, the frequency of the called station ringer is the same as that of the ringer of the calling station.

It is still another object of the present invention to provide a combination harmonic and code ringing reverting call system in which the frequencies and the codes of both the called and calling stations are applied to the calling line on a reverting call, with the exception that when the called and calling stations have the same frequencies but different codes, only the called station code is applied to the line and since the party at the calling station hears this ringing signal, he can tell when the called party answers by the termination of this signal.

Other objects, purposes and characteristic features of the present invention will be in part obvious from the accompanying drawing and more particularly pointed out as the description thereof progresses.

The single figure of the drawing illustrates the apparatus and circuits of one reverting call link for providing the reverting call feature in accordance with the present invention. This drawing illustrates numerous relays, resistors, rectifier and two minor switches of the step-by-step type, these minor switches being similar to minor switches commonly used in an automatic telephone system and associated with connector links for selecting the station of the called line.

For the purpose of simplifying the drawing and facilitating the disclosure, the various parts and circuits constituting the embodiment of the invention have been shown diagrammatically and conventional illustrations have been employed, the drawing having been made more with the purpose of making it easy to understand the principle and mode of operation than with the idea of illustrating the specific construction and arrangement of parts that would be employed in practice. Thus, the various relays and their contacts are illustrated in a conventional manner, with all of the contacts associated with a particular relay being illustrated as attached to this relay by means of a dashed line. The negative side of the common exchange battery is indicated by a minus sign in parentheses (—) and the positive side, which is usually grounded, is indicated by a positive sign in parentheses (+).

While the features of the present invention are applicable to and usable with party line telephone systems using various types of ringing such as code ringing, harmonic ringing or pulsating ringing, the specific embodiment of the invention has been shown in a form adapted for use in a party line system in which five ringing frequencies are provided for selectively ringing five bells on a selected party line with one ring and for selectively ringing five more bells on the same line with two rings.

It is believed that the invention will be best understood by explaining the operation when a calling party dials a particular selector level for selecting the reverting call circuit and extending the tip, ring and sleeve conductors, T, R and S respectively of the calling line to the circuit incoming to the reverting call link illustrated in the accompanying drawing.

The five different ringing frequencies are indicated in the right hand portion of the drawing by the reference characters G1, G2, G3, G4 and G5, it being understood that these five common leads connect to continuous (not interrupted) generators of the associated frequencies, the interrupted ringing being provided by operating ringing relay RG from interrupter leads 1RI and 2RI, these two leads being intermittently energized for providing the one and two rings above mentioned.

When the calling party dials the reverting call digit or digits for selecting the reverting call link and extending the closed circuit of the calling line to this link, relay CB is operated over a circuit extending from (+), upper winding of relay CB, break contact of ringing relay R, break contact of trip relay RT, tip conductor T, and over the calling line and sub-station circuits in series, ring conductor R, break contact of relay RT, break contact of relay R and lower winding of relay CB to (−). The operation of relay CB closes a circuit for operating relay 1CHO extending from (+), make contact of relay CB, break contact of the off normal springs 1ON2 of the first station selector switch and upper winding of relay 1CHO to (−). A circuit is closed at this same time for operating relay 2CHO extending from (+), make contact of relay CB, break contact 2ON2 of the off normal springs of the second minor switch and lower winding of relay 2CHO to (−). It will thus be seen that the two change-over relays 1CHO and 2CHO are operated when the reverting call link is seized. A circuit is now closed for operating slow acting relay SA extending from (+), break contact of timing relay PT, make contact of relay CB, make contact of relay 2CHO and winding of relay SA to (−). The operation of relay SA connects (+) through its make contact and break contact of relay RT to the sleeve conductor S for holding the preceding switches in their operated conditions. The operation of relay SA closes an obvious circuit for operating its repeater relay SAP and the latter relay applies (+) to the start conductor for starting up the ringing and interrupter apparatus, if this apparatus is not already operating.

It will be assumed that the station digit of the called party is number 2 and that the station digit of the calling party is number 1. The called party station digit is dialed first, resulting in the release of relay CB in response to the two impulses of this digit, after which this relay remains energized. The first release of relay CB closes a circuit for operating the lock pulse relay LP extending from (+), break contact to relay CB, make contact of relay SA, make contact of relay 2CHO, break contact and upper winding of relay LP to (−). The operation of relay LP includes resistor 1R in series with its upper winding so that this relay quickly releases when its upper winding is de-energized. Relay LP closes a circuit for operating magnet 1S of the first minor switch extending from (+), make contact of relay LP, make contact and lower winding of relay 1CHO and winding of minor switch step magnet 1S to (−). This circuit advances the first minor switch to its first off normal position and includes the lower winding of relay 1CHO, thus providing a locking circuit for this relay until relay CB is operated at the end of this first impulse. The above circuit from (+) applied to the winding of magnet 1S is extended through its break contact, make contact of relay 1CHO, make contact and lower winding of relay LP for locking this latter relay operated until magnet 1S takes its step and opens its break contact. This provides a means for maintaining the circuit to the stepping magnet complete until this magnet completes its step, irrespective of the length of the impulse which initiates the step.

When relay CB operates at the end of this first impulse transmission, the above described circuit for operating relay LP by way of its upper winding is opened and since the break contact of magnet 1S is open at this time, relay LP is released for effecting the release of magnet 1S. During the time that relay CB is released, relay SA is de-energized but this latter relay is not released because of its slow acting characteristics. With relay LP de-energized, the above described locking circuit for relay 1CHO is open but this relay is not released, due to its slow acting characteristics, it being again energized when relay CB is next released at the beginning of the second impulse for again operating and locking relay LP, the latter relay again completing the locking circuit for relay 1CHO. The operation of relay LP again operates magnet 1S for advancing the first minor switch to its second position and when relay CB is operated at the end of this second impulse transmission, relay LP releases for releasing magnet 1S. Relay SA remains operated because of its slow acting characteristics and relay 1CHO is locked until relay LP releases, after which relay 1CHO releases because this is the end of the impulse transmission for the first digit.

When the calling party dials the number corresponding to the second digit (in this example number 1), relay CB is released once, relay SA remains operated and relay LP is operated and locked for energizing magnet 2S of the second minor switch over a circuit extending from (+), make contact of relay LP, break contact of relay 1CHO, upper winding of relay 2CHO and winding of magnet 2S to (−). This circuit is extended through the break contact of magnet 2S, break contact of relay 1CHO, make contact and lower winding of relay LP for locking this relay until magnet 2S takes its step.

The second minor switch is advanced to its first off normal position and at the end of this impulse transmission, relay LP is released by the operation of relay CB for effecting the release of magnet 2S. Since relay LP remains released for a comparatively long interval of time, relay 2CHO is released and a circuit is closed for again operating relay 1CHO extending from (+), break contact of relay PT, make contact of relay CB, break contact of relay 1CHO, break contact ofr elay 2CHO, make contact of relay SAP and upper winding of relay 1CHO to (−). The operation of relay 1CHO closes a locking circuit for itself extending from (+), make contact of relay CB, make contact of relay 1CHO, break contact of relay 2CHO, make contact of relay SAP and upper winding of relay 1CHO to (−). The operation of relay CB closes a locking circuit for relay SA extending from (+), break contact of relay PT, make contact of relay CB, make contact and winding of relay SA to (−). This locking circuit for relay SA is closed before relay 2CHO releases for opening the operating circuit of relay SA. The calling party, having now dialed the called and calling station digits, hangs up the receiver to effect the ringing back on the calling line.

When the receiver is hung up, relay CB releases and opens up the above described locking circuit for relay SA but before this relay releases, ringing relay R is operated over a circuit extending from (+), break contact of relay CB, make contact of relay SA, break contact of relay 2CHO, make contact of relay 1CHO and winding of relay R to (−). With relay R operated the locking circuit for relay SA is again completed and extends from (+), break contact of relay PT, break contact of relay RT, make contact of relay R, make contact and winding of relay SA to (−). The holding of relay SA in its operated position prevents the release of relay SAP and the consequence release of the minor switch, while relay SA in its operated position maintains (+) on conductor S for holding the preceding switches.

When the common pickup interrupter circuit is closed to mark the beginning of the ringing cycle, (+) on the common pickup conductor CP is extended through make contact of relay R, break contact and winding of relay CS for operating this relay, which in turn closes a locking circuit for itself extending from (+), break contact of relay PT, break contact of relay RT, make contact of relay R, make contact and winding of relay CS to (−). This operation of relay CS extends the common ringing and switching interrupter leads 1RI, 2RI and SW to the RG and SW relays for controlling the ringing. The one ring interrupter applies one pulse to common conductor 1RI and the two ring interrupter applies two pulses to common conductor 2RI during the first portion of the ringing cycle, after which the common interrupter applies a comparatively long pulse to common conductor SW, during which time the 1RI and 2RI common leads are again pulsed with one and two pulses respectively during the second portion of the ringing cycle and before the comparatively long pulse applied to conductor SW is discontinued.

In the present example, the single pulse of (+) potential applied to conductor 1RI extends from this conductor, through a break contact of relay RV, make contact of relay CS and winding of relay RG to (−), for operating this relay and when the pulse is terminated, relay RG is released. In this example, both minor switches are set on points below the sixth off normal point, consequently relay RV will not be energized, with the result that the pulses applied to conductor 2RI are ineffective.

Since it was assumed that the first minor switch was stepped to its second off normal position, the operation of relay RG connects the frequency represented by reference character G2 to the calling line over a circuit which may be traced from the common generator G2, brush 1A of the first minor switch in its second off normal position, break contact of relay SW, make contact of relay RG, lower winding of relay RT (shunted by resistor 4R and condenser 4C), break contact of relay RV, make contact of relay R, break contact of relay RT, conductor R, over the calling line and sub-station circuits, conductor T, break contact of relay RT, make contact of relay R and break contact of relay RV to the other side of the generator source indicated by the reference characters GEN. GRD., which indicates the common generator ground for the return circuit of any particular generator used to ring back on the calling line.

This illustrates how the called station is signaled, it being understood that the setting of the first minor switch brush 1A determines the particular frequency applied to the line to signal the called station. If the first minor switch is set on any off normal position from 1 to 5 inclusive, relay RV will not be operated and since conductor SW is not energized during the first portion of the ringing cycle, relay SW will not be energized. Consequently, when the first digit is one to five inclusive the first portion of the ringing cycle will ring the called station over the above described circuit, with generator being applied to ring line R and with the return path by way of tip line T extending to the generator ground.

If the first minor switch is set on any point from 6 to 10 inclusive, relay SW will remain deenergized during the first portion of the ringing cycle so that relay RV will be operated over the circuit including brush 1B for extending the selected ringing generator to the tip side T of the line and with the return path extending by way of the ring line R to the generator ground. Furthermore, with relay RV operated, two rings are applied to the line circuit during the first portion of the ringing cycle. It will thus be seen how one or two rings of any one of 5 different frequencies are selected and applied to the calling line to signal the called station in response to the first digit dialed into the reverting call link.

Referring back to the present example, that is, with the second minor switch set on its first off normal position, after the first portion of the ringing cycle is terminated, (+) potential is applied to conductor SW and extends through make contact of relay CS, rectifier RCT, winding of relay SW and resistor 3R to (−), for operating relay SW. This (+) is maintained on conductor SW through the second portion of the cycle and when conductor 1RI is energized during this second portion of the ringing cycle the above described circuit is again closed for operating relay RG, thus applying one ring from generator G1 to the ring side of the line. The circuit extends from the common generator lead G1, brush 2A of the second minor switch in its first off normal position, make contact of relay SW, make contact of relay RG, lower winding of relay RT and over the previously described circuit back to generator ground. Relay RG is released to stop the ringing when conductor 1RI is de-energized. This illustrates how the line is signaled in response to the dialing of digit 1 for the second digit. It will be understood that, during this second portion of the ringing cycle, the calling line will be rung with any one of the five frequencies G1 to G5 inclusive as determined by the setting of the second minor switch brush 2A. If the second minor switch is set on any position from one to five inclusive, relay SW will be operated and relay RV will not be operated, thus applying one ring to the line by way of its ring conductor from the selected generator source. If the second minor switch is set on any position from six to ten inclusive, relay SW being operated during the second ringing cycle, then relay RV will be operated over an obvious circuit including brush 2B of the second minor switch for reversing the connection of the generator to the line conductors and for applying 2 rings to the line circuit.

The purpose of resistor 2R connected to the break contact of relay RG is to provide a circuit path for tripping the ring by operating relay RT, as will be later described, during the silent interval when relay RG is not applying ringing current to the line.

When either the called or calling party removes the receiver to answer the call or stop the ringing, the closed circuit across the line provides a path for operating ringing trip relay RT. This relay closes a locking circuit for itself extending from (+), make contact of relay 1CHO, make contact and upper winding of relay RT to (—). The operation of relay RT opens up the above described locking circuit for relay CS for releasing this relay. The operation of relay RT also opens up the above described locking circuit for relay SA for effecting the release of this relay. Relay RT also opens up conductors T, R and S leading back to the preceding switches for effecting the release of these switches. Relay SA opens up and releases relay SAP and this latter relay opens up the locking circuit of relay 1CHO for releasing this relay. The release of relay 1CHO disconnects (+) from the locking circuit of the RT relay for effecting the release of this relay. The release of relay SA opens up and releases relay R. The release of relay SAP closes circuits for releasing the two minor switches extending from (+), break contact of relay SAP, off normal contacts 1ON1 and 2ON1 and windings of release magnets 1RL and 2RL in multiple to (—). When these two minor switches are restored to normal, their off normal contacts are opened for opening up the above described release magnet circuits for de-energizing these magnets. The reverting call link is now restored to normal and since the disconnection of (+) from conductor S leading back to the preceding switches effected the release of the line circuit (not shown), the closed circuit across the line is now effective to place this line circuit in a locked out condition in a manner well-known to those skilled in the art and of no importance in connection with the present invention.

Brushes 1C and 2C of the two minor switches have their bank contacts arranged to prevent the application of both the called and calling codes to the line on a reverting call when both stations of this call are signaled by the same generator. This is to prevent confusion in connection with code ringing, which it will be understood may include one and two rings as described in the present embodiment or code ringing of more than one and two rings may be provided. From an examination of the connections of the bank contacts of brushes 1C and 2C it will be observed that, if the called and calling digits set the first and second minor switches respectively on the bank contacts which select the same frequency, only the called frequency will be rung and this will be during the first portion of the ringing cycle.

More specifically, it will be assumed that the called digit is number 4 calling for 1 ring of frequency G4, thus effecting the setting of brushes 1A, 1B and 1C on the fourth off normal set of terminals in response to the first digit. It will furthermore be assumed that the calling station digit is number 9 calling for 2 rings of frequency G4, resulting in the second minor switch setting its brushes 2A, 2B and 2C on the 9th off normal position. During the first portion of the ringing cycle, generator G4 will be connected to the line by way of brush 1A and break contact of relay SW in a manner that will be obvious from the previous description. Now when the (+) is applied to common conductor SW during the second portion of the ringing cycle, relay SW cannot operate because (+) is connected to the point between its winding and resistor 3R over a circuit extending from brush 2C in its 9th off normal position and brush 1C in its 4th off normal position to the connection between relay SW and resistor 3R. This prevents the operation of relay SW, which in turn prevents the operation of relay RV from (+) on brush 2B and also prevents the connection of generator G4 by way of brush 2A to the line during the second portion of the ringing cycle.

If the called digit is number 9, calling for 2 rings of frequency G4 and the calling digit is number 4, calling for 1 ring of frequency G4, then the brushes of the first minor switch will be on the 9th off normal position and the brushes of the second minor switch will be on the 4th off normal position. During the first portion of the ringing cycle, relay SW will be in its non-operated position and relay RV will be in its operated position, thus applying 2 rings of frequency G4. During the second portion of the ringing cycle, relay RV remains operated by way of brush 1B because relay SW is short circuited (and not operated) by way of brushes 2C and 1C, thus again operating relay RG from conductor 2RI to provide 2 rings from generator G4 by way of brush 1A in its 9th off normal position. It will thus be seen that the ringing of both codes is prevented when the called and calling digits are such as to select the same frequency.

Permanent time out relay PT is for the purpose of effecting the automatic release of the circuits if they are not cleared out in the normal manner, as above described, within a predetermined time. When the reverting call link is seized and relay SAP is operated, the common pickup lead is connected to the winding of relay PT and the (+) pulse applied to this common conductor at the beginning of the time out cycle is effective to operate relay PT and lock it to the (+) at the uppermost make contact of relay SAP. The operation of relay PT also transfers the holding circuits from direct (+) to the common hold conductor, this conductor being maintained in connection with (+) until the end of the time out period. If the link has not been normally released before the end of the time out period, the disconnection of (+) from the common hold conductor effects the release of relay SA, after which relay SAP is released, thus clearing out the reverting call circuit and releasing the preceding switches in the previously described manner.

Having described a reverting call system as particularly adaptable for service in party line ringing systems of the full automatic type, it is to be understood that this form is selected to facilitate the disclosure of the invention rather than to limit the number of forms which it may assume, and it is to be further understood that various modifications, adaptations and alterations may be applied to the specific form shown to meet the requirements of practice without in any manner departing from the spirit or scope of the present invention except as limited by the appended claims.

What I claim is:

1. In a telephone system a plurality of stations; an exchange; a party line connecting said plurality of stations with said exchange; and reverting call signaling apparatus for selectively signaling said stations, said apparatus including a pair of signal selecting stepping switches each having an operating magnet, means responsive to two series of impulses sent by a calling one of said stations over said party line for respectively setting one of said switches to record the identity of the called one of said stations and the other switch to record the identity of said calling station; said means comprising an impulse receiving relay, an auxiliary relay controlled by said impulse receiving relay to actuate said magnets, a change over relay controlled by said auxiliary relay and effective upon termination of the first impulse series to transfer the impulse circuit to the magnet of the second switch and two inter-locking devices respectively controlled by said two magnets and connected to said auxiliary relay to prevent the auxiliary relay from again changing its condition before the associated switch has completed a step.

2. In a telephone system, a plurality of stations; an exchange; a party line connecting said plurality of stations with said exchange; and reverting call signaling apparatus in said exchange for connecting to said line predetermined sources of electrical energy in accordance with predetermined time patterns to selectively signal said stations, said apparatus including a pair of source-and-time-pattern selecting devices, means responsive to impulses sent under the control of the party at a calling one of said stations to directively set one of said devices in accordance with the identity of the called one of said stations and directively set the other device in accordance with the identity of said calling station, and means controlled by the setting of said devices in relation to each other and effective after the calling partly has replaced his receiver to ordinarily permit the connection of both said sources to said line, one in accordance with the time pattern assigned for signaling the called station and the other in accordance with the time pattern assigned for signaling the calling station, but if the setting of said two devices is determinative of the same source to permit the connection of the last mentioned source to said line in accordance with the time pattern assigned for signaling said called station only.

3. In a telephone system a plurality of stations; an exchange; a party line connecting said plurality of stations with said exchange; signal receiving means at one group of said stations responsive to current of only one signal frequency and signal receiving means at another group of said stations responsive to current of only another signal frequency to signal the associated station; and reverting call signaling apparatus of the code and frequency ringing type in said exchange for transmitting selective signals over said line, said apparatus including a pair of signal selecting devices, means responsive to impulses sent under the control of the party at a calling one of said stations to directively set one of said devices to record the identity of the called one of said stations and directively set the other device to record the identity of said calling station, and means controlled by the setting of said devices in relation to each other and effective after the calling party has replaced his receiver to transmit both a signal characteristic of the called station and a signal characteristic of the calling station when said two devices have been set to positions indicative of said called and calling stations belonging to different groups and to transmit a signal characteristic of said called station only when said two devices have been set to positions indicative of said called and calling stations belonging to the same group.

4. In a telephone system a plurality of stations; an exchange; a party line connecting said plurality of stations with said exchange; signal receiving means at one group of said stations responsive only to one class of signals and signal receiving means at another group of stations responsive only to another class of signals to signal the associated station; and reverting call signaling apparatus in said exchange for selectively transmitting code signals over said line, said apparatus including a pair of signal selecting devices having switching elements, means responsive to impulses sent under the control of the partly at a calling one of said stations to directively set one of said devices to record the identity of the called one of said stations and directively set the other device to record the identity of said calling station, a pulsing circuit, transfer means controlled by said pulsing circuit and normally effective after the calling party has replaced his receiver to periodically switch said line from switching elements of said first mentioned device to switching elements of said second mentioned device for alternately transmitting a signal characteristic of the called station and a signal characteristic of the calling station, and a circuit closed under the control of switching elements of both devices when said devices have been set to positions indicative of said called and calling stations belonging to the same group to make said transfer means ineffective.

5. In a telephone system a plurality of stations; an exchange; a party line connecting said plurality of stations with said exchange; signal receiving means at one group of said stations responsive to current of only one signal frequency and signal receiving means at another group of said stations responsive to current of only another signal frequency to signal the associated station; and reverting call signaling apparatus of the code and frequency ringing type in said exchange for transmitting selective signals over said line, said apparatus including a pair of signal selecting devices, means responsive to impulses sent under the control of a party at a calling one of said stations to directively set one of said devices to record the identity of the called one of said stations and directively set the other device to record the identity of said calling station, and means controlled by the setting of said devices in relation to each other and effective after the calling party has replaced his receiver to transmit both a signal characteristic of the called station and a signal characteristic of the calling station when said two devices have been set to positions indicative of said called and calling stations belonging to different groups and transmit a signal characteristic of said called station but distinct from the first mentioned characteristic called-party signal only when said two devices have been set to positions indicative of said called and calling stations belonging to the same group.

6. In a telephone system a plurality of stations; an exchange; a party line connecting said plurality of stations with said exchange; signal receiving means at one group of said stations responsive to current of only one signal frequency and signal receiving means at another group of said stations responsive to current of only another signal frequency to signal the associated station; and reverting call signaling apparatus of the code and frequency ringing type in said exchange for transmitting selective signals over said line, said apparatus including a pair of signal selecting devices, means responsive to impulses sent under the control of the party at a calling one of said stations to directively set one of said devices to record the identity of the called one of said stations and directively set the other device to record the identity of said calling station, a pulsing circuit, transfer means controlled by said pulsing circuit and normally effective after the calling party has replaced his receiver to periodically switch said line from switching elements of said first mentioned device to switching elements of said second mentioned device for alternately transmitting a signal characteristic of the called station and a signal characteristic of the calling station, and a circuit closed under the control of switching elements of both devices when said devices have been set to positions indicative of said called and calling stations belonging to the same group to make said transfer means ineffective.

7. In a telephone system a plurality of stations; an exchange; a party line connecting said plurality of stations with said exchange; signal receiving means at one group of said stations responsive to current of only one signal frequency and signal receiving means at another group of said stations responsive to current of only another signal frequency to signal the associated station; and reverting call signaling apparatus of the code and frequency ringing type in said exchange for transmitting selective signals over said line, said apparatus including a pair of signal selecting devices, means responsive to impulses sent under the control of the party at a calling one of said stations to directively set one of said devices to record the identity of the called one of said stations and directively set the other device to record the identity of said calling station, a switching pulse lead common to a plurality of signaling apparatus, a transfer relay controlled by pulses received over the last mentioned lead and normally effective after the calling party has replaced his receiver to switch said line from switching elements of said first mentioned device to switching elements of said second mentioned device for alternately transmitting a signal characteristic of the called station and a signal characteristic of the calling station, a rectifier interposed in the connection between said transfer relay and said pulse lead, and a shunt connection for said relay extending over a pair of switching elements of said two devices in series when said two switches have been set to positions indicative of said called and calling stations belonging to the same group to make said transfer relay ineffective, said rectifier preventing said shunt connection from causing a back-feed into said common pulse lead.

8. In a telephone system a plurality of stations; an exchange; a party line connecting said plurality of stations with said exchange; signal receiving means at one group of said stations responsive to current of only one signal frequency and signal receiving means at another group of said stations responsive to current of only another signal frequency to signal the associated station; and reverting call signaling apparatus of the one and two ring frequency ringing type in said exchange for transmitting selective signals over said line, said apparatus including a pair of signal selecting devices, means responsive to impulses sent under the control of the party at a calling one of said stations to directively set one of said devices to record the identity of the called one of said stations and directively set the other device to record the identity of said calling station, an interrupter relay, a one ring pulse lead and a two ring pulse lead, a code selecting relay effective under the control of a first pair of said switching elements to connect said interrupter relay to one of said pulse leads, a plurality of frequency leads connected to a second pair of said switching elements, a ringing circuit controlled by said interrupter relay and said second pair of switching elements for intermittently connecting one of said frequency leads to said line, a switching pulse lead, a transfer relay controlled by pulses received over the last mentioned lead and normally effective after the called party has replaced his receiver to periodically switch said line from the first and second switching elements of said first mentioned device to the first and second switching elements of said second mentioned device for alternately transmitting a signal characteristic of the called station and a signal characteristic of the calling station, and a circuit closed over a third pair of switching elements of said two devices in series when said devices have been set to positions indicative of said called and calling stations belonging to the same group to make said transfer relay ineffective for suppressing the calling station's signal and transmitting the called station's signal at twice its normal rate of repetition.

9. In a telephone system a plurality of stations; an exchange; a party line connecting said plurality of stations with said exchange; and reverting call signaling apparatus for selectively signaling said stations, said apparatus including a signal selecting stepping switch having an operating magnet, means responsive to impulses sent by a calling one of said stations over said party line to directively set said switch to record the identity of a station on said line; said means comprising an impulse receiving relay and an auxiliary relay operated under the control of said impulse receiving relay to actuate said magnet, a locking circuit being provided for said auxiliary relay for locking the auxiliary relay in its operated position under the control of said magnet to insure completion of each step of said switch.

JAMES D. CONFELD.

REFERENCES CITED

The following references are of record in the file of this patent:

UNITED STATES PATENTS

| Number | Name | Date |
|---|---|---|
| 1,450,321 | Lundell | Apr. 3, 1923 |
| 1,747,405 | Von Beckerath | Feb. 18, 1930 |
| 1,831,730 | Ahlberg | Nov. 10, 1931 |
| 1,944,704 | Bellamy | Jan. 23, 1934 |
| 2,278,548 | Kudrna | Apr. 7, 1942 |
| 2,335,473 | Bakker | Nov. 30, 1943 |